(12) United States Patent
Hopper

(10) Patent No.: US 9,460,406 B1
(45) Date of Patent: Oct. 4, 2016

(54) MANAGEMENT OF EVENT REMINDER NOTIFICATIONS BASED ON CONFLICTING EVENTS

(71) Applicant: CA, Inc., Islandia, NY (US)

(72) Inventor: Robin Hopper, Prague (CZ)

(73) Assignee: CA, Inc., New York, NY (US)

( * ) Notice: Subject to any disclaimer, the term of this patent is extended or adjusted under 35 U.S.C. 154(b) by 129 days.

(21) Appl. No.: 13/894,515

(22) Filed: May 15, 2013

(51) Int. Cl.
*G06Q 10/00* (2012.01)
*G06F 15/173* (2006.01)
*G06Q 10/06* (2012.01)
*H04L 29/08* (2006.01)

(52) U.S. Cl.
CPC ... *G06Q 10/06312* (2013.01); *H04L 29/08072* (2013.01)

(58) Field of Classification Search
None
See application file for complete search history.

(56) References Cited

U.S. PATENT DOCUMENTS

| | | | | |
|---|---|---|---|---|
| 6,209,011 | B1* | 3/2001 | Vong et al. | 708/112 |
| 7,385,875 | B2* | 6/2008 | May et al. | 368/10 |
| 7,941,133 | B2 | 5/2011 | Aaron et al. | |
| 7,974,849 | B1* | 7/2011 | Begole et al. | 705/1.1 |
| 8,823,507 | B1* | 9/2014 | Touloumtzis | 340/501 |
| 2007/0078905 | A1* | 4/2007 | Gunther et al. | 707/201 |
| 2008/0016188 | A1* | 1/2008 | Batni et al. | 709/220 |
| 2009/0168607 | A1* | 7/2009 | Liu et al. | 368/10 |
| 2011/0289451 | A1* | 11/2011 | Fischer | 715/808 |
| 2012/0161922 | A1* | 6/2012 | Chiang et al. | 340/3.1 |
| 2012/0254419 | A1* | 10/2012 | Gilzean et al. | 709/224 |
| 2013/0198652 | A1* | 8/2013 | Dunn et al. | 715/751 |
| 2013/0211911 | A1* | 8/2013 | Krietzman | 705/14.53 |
| 2014/0074534 | A1* | 3/2014 | Hamilton et al. | 705/7.19 |

FOREIGN PATENT DOCUMENTS

| | | |
|---|---|---|
| EP | 2073156 A1 | 6/2009 |
| EP | 2388977 A1 | 11/2011 |

* cited by examiner

*Primary Examiner* — Sujay Koneru
(74) *Attorney, Agent, or Firm* — Myers Bigel & Sibley, P.A.

(57) ABSTRACT

A method of generating an event reminder notification includes obtaining scheduling data for a future event. The scheduling data includes an initial time at which an event reminder notification for the future event is to be generated. A conflicting event that will conflict with providing the event reminder notification to a user at the initial time is identified. An adjusted time is determined at which the event reminder notification for the future event is to be generated before occurrence of the conflicting event. The event reminder notification is generated based on the adjusted time. Related computer systems and computer program products are disclosed.

20 Claims, 8 Drawing Sheets

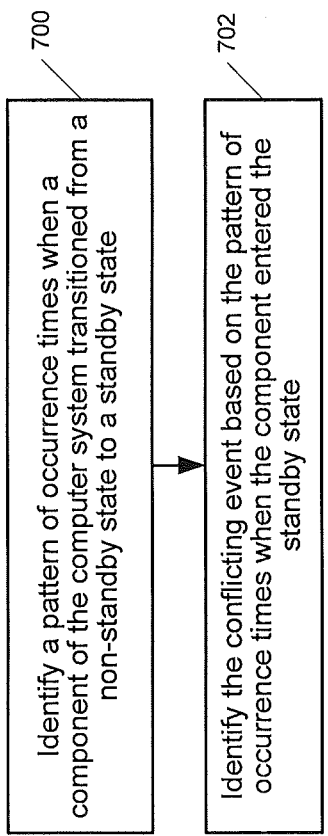
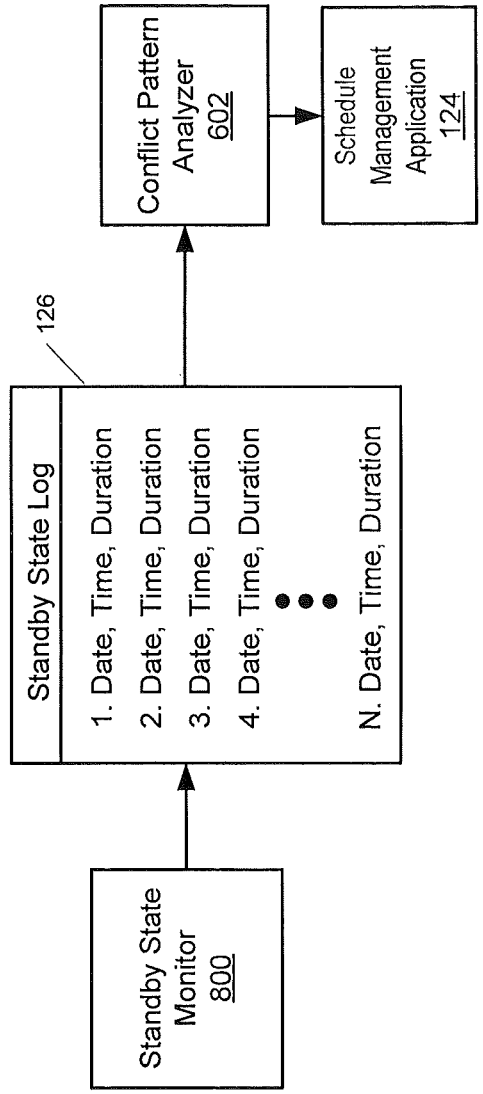

MANAGEMENT OF EVENT REMINDER NOTIFICATIONS BASED ON CONFLICTING EVENTS

BACKGROUND

The present disclosure relates to scheduling of events using electronic devices.

Time management is a common and increasing problem in today's society. As commitments increase, keeping track of appointments, tasks, errands, and meetings and their associated times and/or locations may become increasingly difficult. Planning the logistics of trips between scheduled events may also be time-consuming.

As such, various computer systems have been developed to aid in time management. Example computer systems include desktop computers, laptop computers, and tablet computers, and schedule management software applications include Microsoft Outlook®. These computer systems and software can allow users to intuitively access and manage their scheduled tasks and/or appointments. For example, scheduling data for future appointments may be entered into a schedule management application and stored in a memory of the computer system. The schedule management application can use the scheduling data to determine when to provide a reminder to a user prior to an appointment. The reminder may include an audible reminder and/or a displayed message reminder.

BRIEF SUMMARY

According to one aspect of the present disclosure, a method of generating an event reminder notification includes obtaining scheduling data for a future event. The scheduling data includes an initial time at which an event reminder notification for the future event is to be generated. A conflicting event that will conflict with providing the event reminder notification to a user at the initial time is identified. An adjusted time is determined at which the event reminder notification for the future event is to be generated before occurrence of the conflicting event. The event reminder notification is generated based on the adjusted time.

The conflicting event may be identified based on: 1) a reserved timeframe identified by a user during which the user will be unavailable to receive an event notification from the computer system; 2) a pattern of occurrence times of inactivity notifications; 3) a pattern of occurrence times when a component of the computer system transitions from a non-standby state to a standby state; 4) a pattern of occurrence times when a user logs off an account of the computer system; and/or 5) initiation of a shutdown process which will power off a component of the computer system needed for generating the event reminder notification.

Related computer systems and computer program products are disclosed. It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures.

FIGS. 7 and 8 respectively illustrate a flowchart of operations for managing event reminder notifications based on a pattern of occurrence times when a component of the computer system transitions to a standby state, and related computer system components according to some embodiments.

DETAILED DESCRIPTION

Figure 1:
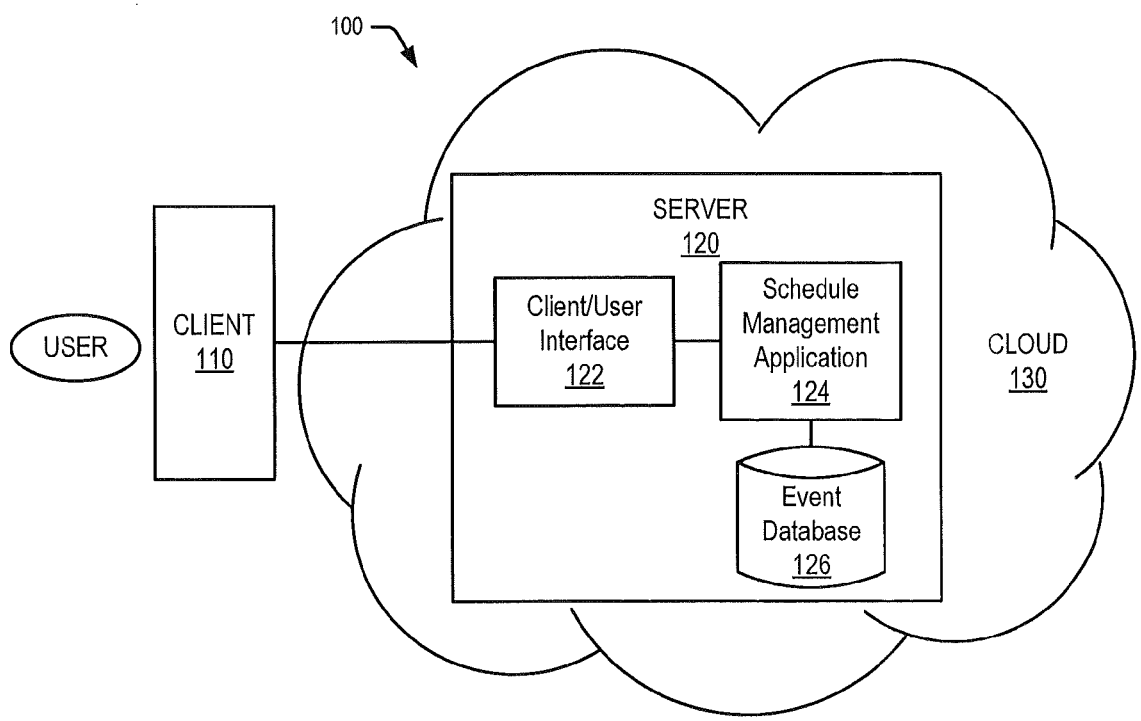
FIG. 1 illustrates is a block diagram of a computer system that manages event reminder notifications according to some embodiments.

Embodiments of the present disclosure will be described more fully hereinafter with reference to the accompanying drawings. Other embodiments may take many different forms and should not be construed as limited to the embodiments set forth herein. Like numbers refer to like elements throughout.

Although some schedule management applications output an audible reminder and/or display a message reminder through a computer system for an upcoming scheduled event, the reminder is not effective if the user is not presently attentive to the computer system. For example a meeting reminder may be set to occur 15 minutes before a meeting. However, if the user is away for lunch at the time of the meeting reminder, the meeting reminder doesn't accomplish its intended purposes. Similarly, if a meeting is scheduled to occur the next day before the user normally arrives at a worksite of the computer system, the user would not receive any meeting reminder generated by the computer system.

Embodiments disclosed herein are directed to identifying a conflicting event that will conflict with providing an event reminder notification to a user at a defined initial time, determining an adjusted time at which the event reminder notification for the future event is to be generated before occurrence of the conflicting event, and generating the event reminder notification based on the adjusted time. Further embodiments disclosed herein are directed to various methods and operations for identifying the conflicting event and determining the adjusted time.

These and other embodiments are described below with regard to FIG. 1, which illustrates an example computer system 100 that manages event reminder notifications. The computer system 100 includes a schedule management application 124 is configured to organize future appointments, tasks, errands, and meetings, herein referred to as events, for a user. The schedule management application 124 may reside on user equipment, such as a cellular phone, a tablet computer, desktop computer, or other computer system operated by a user. Alternatively, as shown in the non-limiting example of FIG. 1, the schedule management application 124 may reside on a computer server 120 (e.g. a Microsoft Exchange® type server) that is networked through a client/user interface 122 to a client device 110 (e.g., cellular phones, tablet computer, desktop computer, etc.). Data regarding scheduled events is stored in an event database 126 that is accessed by the schedule management application 124 to provide schedule management functionality for the user. The computer server 120 may reside on a private network (e.g., wireless/wired local area network) and/or a public network (e.g., Internet) such in among networked computer resources in a Cloud 130 environment.

Figure 2:
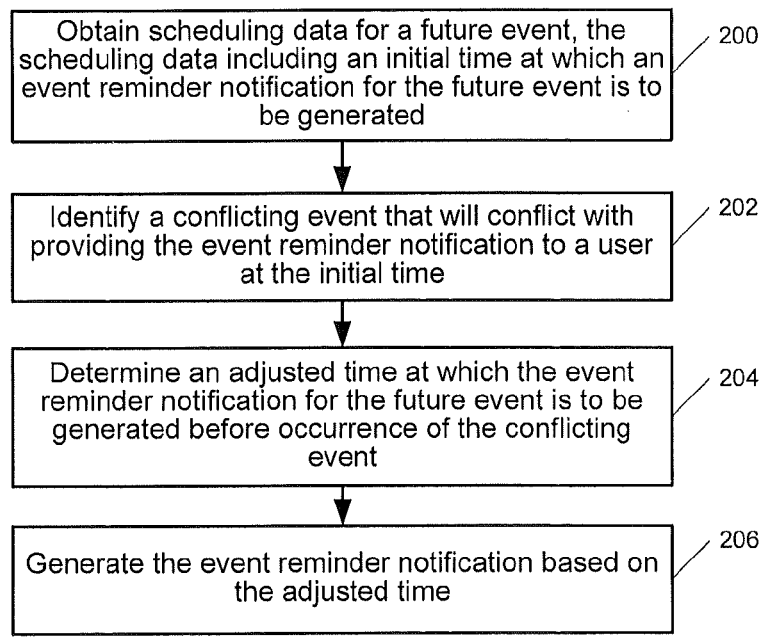
FIG. 2 is a flowchart of operations for managing event reminder notifications according to some embodiments.

FIG. 2 is a flowchart of operations for managing event reminder notifications according to some embodiments. The operations may be performed by the schedule management application 124 of FIG. 1. Scheduling data for a future event is obtained (block 200). The scheduling data includes an initial time at which an event reminder notification for the future event is to be generated. The scheduling data may, for example, be defined through a graphical user interface (e.g., displayed by the client/user interface 122 and/or the client device 110) that allows an event to be defined by name, date, start time, duration, and/or other relevant data.

The initial time may be a defined as an offset time before a time of day for a scheduled event when the event reminder notification is to be generated (e.g., generate the event reminder notification 15 minutes before a 1:00 pm scheduled event).

A conflicting event is identified (block 202) that will conflict with providing the event reminder notification to a user at the initial time. As explained further below, the conflicting event may be identified based on: 1) a reserved timeframe identified by a user during which the user will be unavailable to receive an event notification from the computer system; 2) a pattern of occurrence times of inactivity notifications; 3) a pattern of occurrence times when a component of the computer system transitions from a non-standby state to a standby state; 4) a pattern of occurrence times when a user logs off an account of the computer system; and/or 5) initiation of a shutdown process which will power off a component of the computer system needed for generating the event reminder notification.

An adjusted time is determined (block 204) at which the event reminder notification for the future event is to be generated before occurrence of the conflicting event. The event reminder notification is generated (block 206) based on the adjusted time.

In this manner, the schedule management application 124 or another component of the computer system 100 identifies a conflicting event that will conflict with providing an event notification to a user, determines an adjusted time for providing the event reminder notification, and then generates an event reminder notification based on the adjusted time. The conflicting event can be defined by the user and/or the schedule management application 124 can observe processes or patterns of processes that can conflict with providing an event notification to a user (e.g., because the user is deemed to be away from the computer system 100 and/or client device 110).

Figure 3:
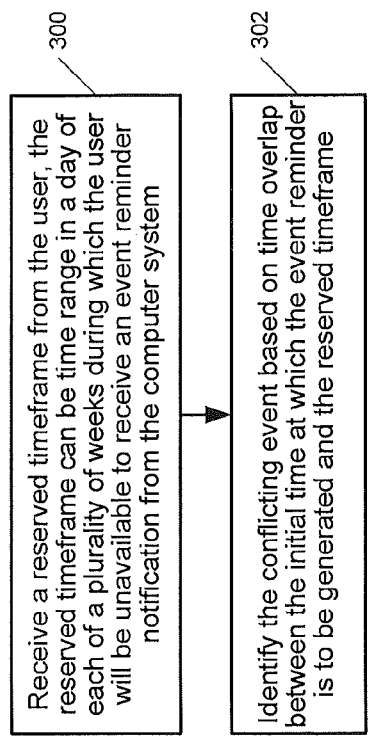
FIGS. 3 and 4 respectively illustrate a flowchart of operations for managing event reminder notifications based on a reserved timeframe, and an example scheduling data on a screen layout that is used by computer system components according to some embodiments.
Figure 4:
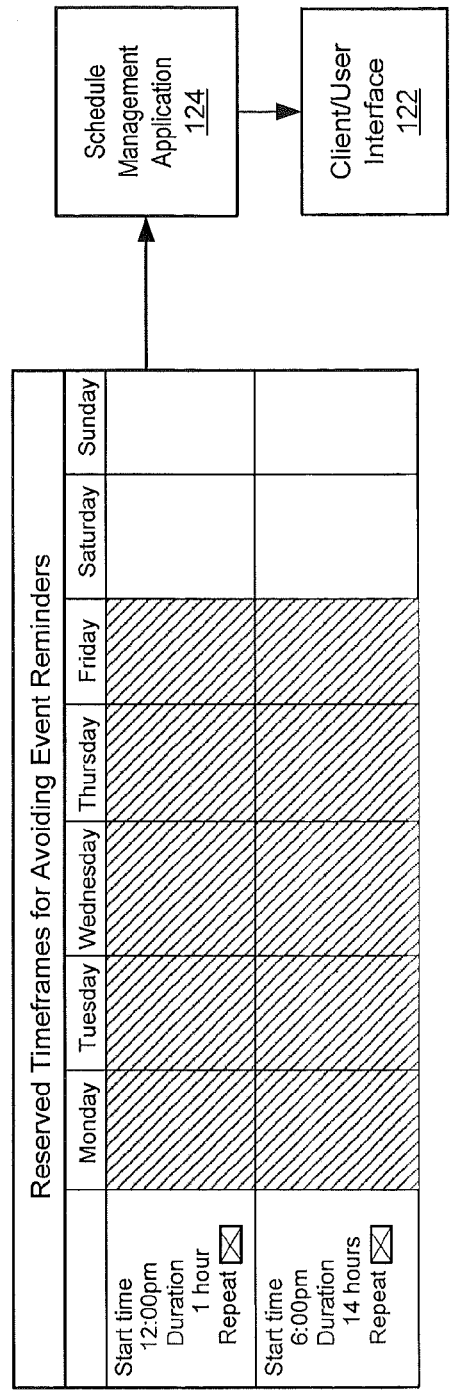

FIGS. 3 and 4 respectively illustrate a flowchart of operations for managing event reminder notifications based on a reserved timeframe, and an example scheduling data on a screen layout that is used by computer system components according to some embodiments. A reserved timeframe is received (block 300) from the user. The reserved timeframe may be a time range in a day of each of a plurality of weeks during which the user will be unavailable to receive an event reminder notification from the computer system. The conflicting event is identified (block 302) based on time overlap between the initial time at which the event reminder is to be generated and the reserved timeframe.

In the example screen layout of FIG. 4, a user has defined reserved time frames for avoiding event reminders. One reserved timeframe can correspond to a planned time for leaving the office for lunch, starting at 12:00 pm for a 1 hour duration repeating each work day Monday through Friday. Another reserved timeframe can correspond to a planned time for leaving the office for the rest of the day, starting at 6:00 pm for a 14 hour duration (e.g., until the user plans to typically return to the computer system to start another workday) and repeating each work day Monday through Friday.

Scheduling data defining these reserved timeframes is received by the schedule management application 124 for use in identifying a conflicting event based on time overlap between the initial time at which an event reminder is to be generated and the reserved timeframe. The schedule management application 124 may therefore adjust timing of an event reminder notification that would normally be generated by the computer system between 12:00 pm and 1:00 pm to instead occur before that timeframe and, similarly, adjust timing of an event reminder notification would normally be generated between 6:00 pm and 8:00 am to instead occur before that timeframe. Thus, for example, if an event reminder is originally scheduled to occur at an initiate time of 12:45 pm (which is 15 minutes before a 1:00 pm meeting), the schedule management application 124 can instead generate the event reminder at 11:45 (15 minutes before the 12:00 pm conflicting event). The user would thereby be more likely to be attentive to the computer system and available to receive rescheduled event reminder notifications, by viewing a display screen of the computer system to view displayed event reminder notifications and/or be within hearing range of a speaker of the computer system to hear any audible event reminder notifications.

Figure 5:
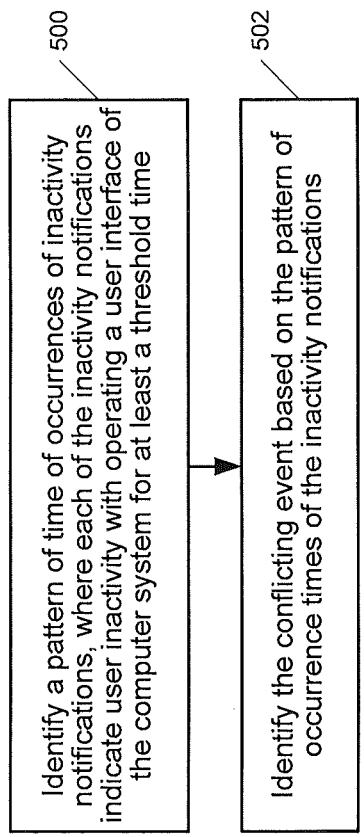
FIGS. 5 and 6 respectively illustrate a flowchart of operations for managing event reminder notifications based on a pattern of occurrence times of inactivity notifications, and related computer system components according to some embodiments.
Figure 6:
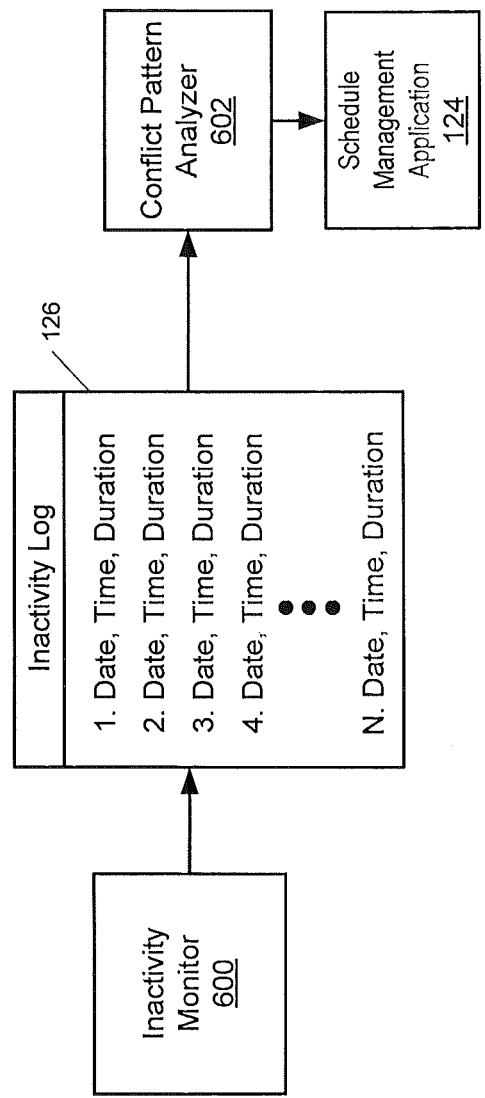

FIGS. 5 and 6 respectively illustrate a flowchart of operations for managing event reminder notifications based on a pattern of occurrence times of inactivity notifications, and related computer system components according to some embodiments. A pattern of occurrence times of at least one inactivity notification on each of a plurality of days is, identified (block 500). Each of the inactivity notifications indicate user inactivity with operating a user interface of the computer system for at least a threshold time. The inactivity notifications may, for example, be triggered when the user has not selected a key of a keyboard/keypad, moved a mouse, selected a mouse button/touchpad/touch screen interface, or provided other input to the computer system for at least a threshold time. The conflicting event is identified (block 502) based on the pattern of occurrence times of the at least one inactivity notification on each of the plurality of days.

In this manner, when the user has not selected a key of a keyboard/keypad, moved a mouse, selected a mouse button/touchpad/touch screen interface, or provided other input to the computer system for at least a threshold time, an inactivity monitor 600 can generate an inactivity notification. The inactivity monitor 600 can store inactivity notifications in an activity log 126 that identifies the date, time of day, and/or the duration of inactivity (e.g., how long the inactivity lasted). A conflict pattern analyzer 602 identifies a pattern among the logged inactivity notifications, and can identify from the pattern when a user has a habit of being away from the computer system and, therefore, unavailable to receive an event notification.

The conflict pattern analyzer 602 may, for example, learn when a user typically begins using a computer system at the start of a workday, temporarily stops using the computer system for lunch or other breaks, and when the user typically ceases using the computer system at the end of the workday. The schedule management application 124 can identify conflicting events from the pattern identified by the conflict pattern analyzer 602. Although the inactivity monitor 600 and the conflict pattern analyzer 602 are shown as being separate from the schedule management application 124 for ease of illustration and explanation, their functionality may be at least partially combined with the schedule management application 124.

FIGS. 7 and 8 respectively illustrate a flowchart of operations for managing event reminder notifications based on a pattern of occurrence times when a component of the computer system transitions to a standby state, and related computer system components according to some embodiments. A pattern of occurrence times when a component of the computer system transitions from a non-standby state to a standby state is identified (block 700). Transition of the component from the non-standby state to the standby state may correspond to the computer system entering a sleep mode, a screen lock/keyboard lock mode, and/or a lower power consumption mode, which can occur in response to user inactivity for at least a threshold time and/or in response to a user controlling transition to the standby state. The conflicting event is identified (block 702) based on the pattern of occurrence times when the component entered the standby state.

In this manner, when the component of the computer system transitions from the non-standby state to the standby state, a standby state monitor 800 can add a data entry to a standby state log 126 that identifies the date and/or time of day when the component transition to the standby state occurred, and/or the duration of time that the component was in the standby state. A conflict pattern analyzer 602 identifies a pattern among the data entries of the standby state law 126, and can identify from the pattern when the component is likely to enter standby state in the future and, thereby, unable to generate an event notification. The conflict pattern analyzer 602 may, for example, learn when the computer system component has historically transitioned to standby state because, for example, the user has left for lunch and/or at the end of a workday. The schedule management application 124 can use the historical data to predict future conflicting events from the pattern identified by the conflict pattern analyzer 602. Although the standby state monitor 800 and the conflict pattern analyzer 602 are shown as being separate from the schedule management application 124 for ease of illustration and explanation, their functionality may be at least partially combined with the schedule management application 124.

Figure 9:
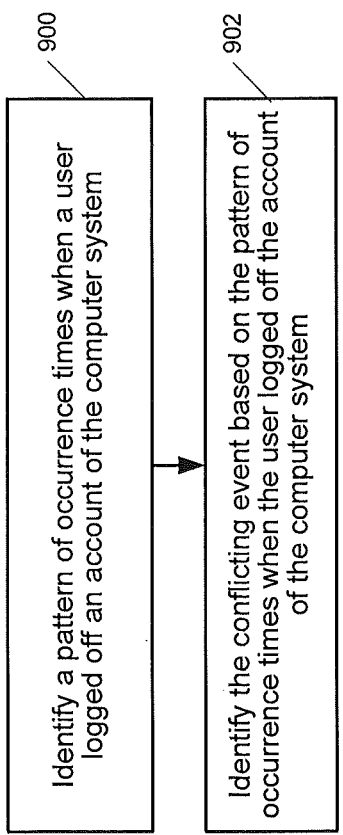
FIGS. 9 and 10 respectively illustrate a flowchart of operations for managing event reminder notifications based on pattern of occurrences time when a user logs off an account of the computer system, and related computer system components according to some embodiments.
Figure 10:
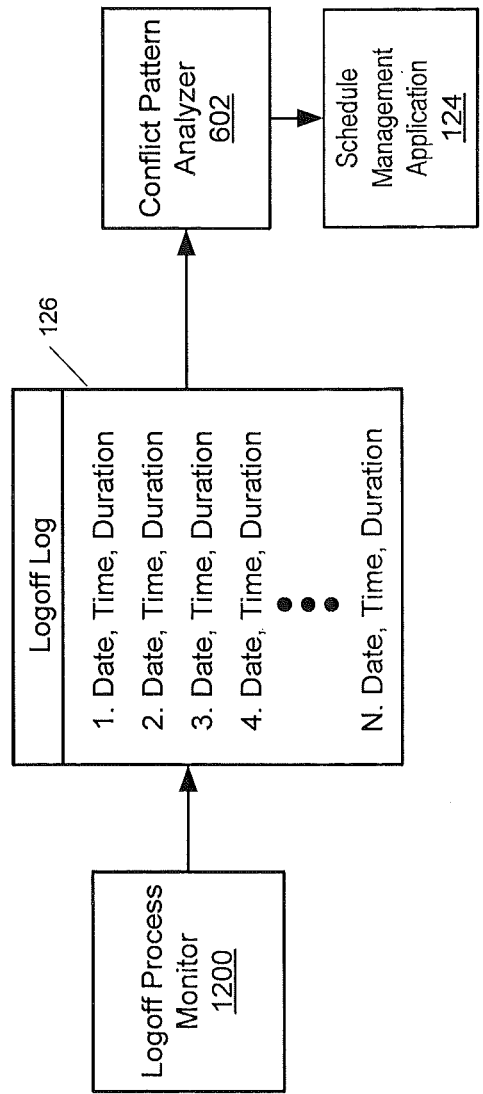

FIGS. 9 and 10 respectively illustrate a flowchart of operations for managing event reminder notifications based on pattern of occurrence times when a user logged off an account of the computer system, and related computer system components according to some embodiments. A pattern of occurrence times when a user logged off an account of the computer system is identified (block 900). The pattern may be determined within a single day or may be determined over a plurality of days (e.g., over a week). The conflicting event is identified (block 902) based on the pattern of occurrence times when the user logged off the account of the computer system.

In this manner, when the user logs off an account of the computer system, a logoff process monitor 1200 can add a data entry to a logoff log 126 that identifies the date and/or time of day when the user logged off the account, and/or the duration of time while the user was logged off the account. A conflict pattern analyzer 602 identifies a pattern among the data entries of the logoff log, and can identify from the pattern when the user as a habit of logging off the computer and predict, therefrom, when in the future the user is likely to logoff the account and be unable to receive an event notification which requires the user be logged into the account. The schedule management application 124 can identify conflicting events from the pattern identified by the conflict pattern analyzer 602. Although the logoff process monitor 1200 and the conflict pattern analyzer 602 are shown as being separate from the schedule management application 124 for ease of illustration and explanation, their functionality may be at least partially combined with the schedule management application 124.

Figure 11:
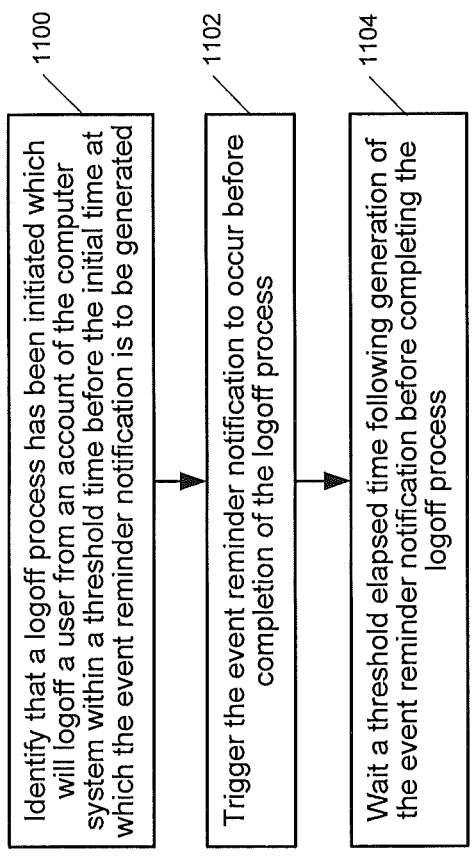
FIGS. 11 and 12 respectively illustrate a flowchart of operations for managing event reminder notifications based on initiation of a logoff process to logoff a user from an account of the computer system, and related computer system components according to some embodiments.
Figure 12:
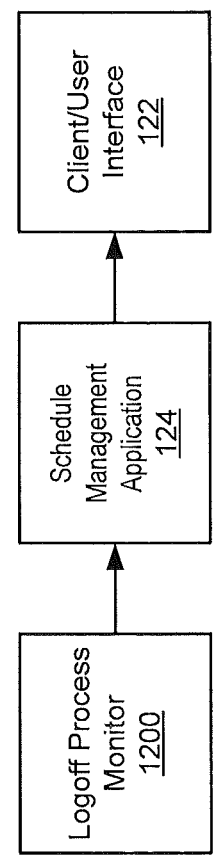

In another embodiment, the computer system responds to a user initiating a logoff process by determining whether the system will be unable to provide an upcoming event notification to the user and, if so, provides that event notification before completing the logoff process. FIGS. 11 and 12 respectively illustrate a flowchart of operations for managing event reminder notifications based on initiation of a logoff process to logoff a user from an account of the computer system, and related computer system components according to some embodiments.

A logoff process monitor 1200 identifies (block 1100) that a logoff process has been initiated which will logoff a user from an account of the computer system within a threshold time before the initial time at which the event reminder notification is to be generated. The schedule management application 124 can trigger (block 1102) the event reminder notification to occur through the client/user interface 122 before completion of the logoff process. The schedule management application 124 may wait (block 1104) a threshold elapsed time following generation of the event reminder notification before allowing the logoff process monitor 1200 or another application of the computer system to complete the logoff process. In another embodiment, the schedule management application 124 may wait until an acknowledgement is received from the user following generation of the event reminder notification before allowing the logoff process monitor 1200 or another application of the computer system to complete the logoff process.

Figure 13:
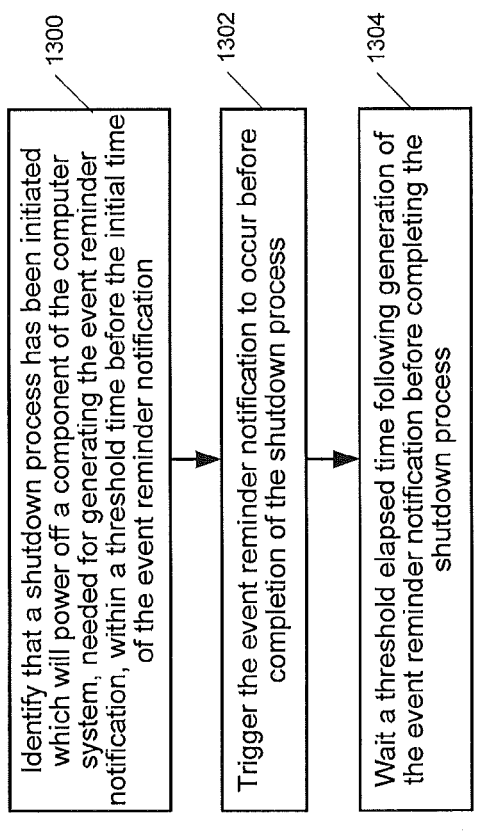
FIGS. 13 and 14 respectively illustrate a flowchart of operations for managing event reminder notifications based on initiation of a shutdown process which will power off a component of the computer system needed for generating the event reminder notification, and related computer system components according to some embodiments.
Figure 14:
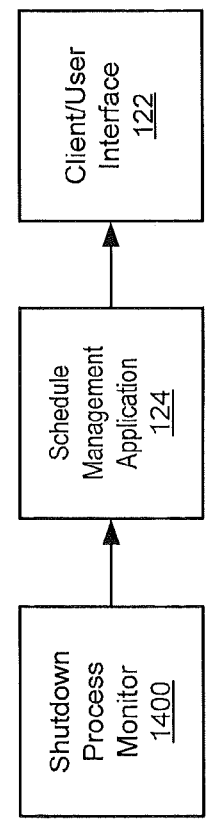

In another embodiment, the computer system responds to a user initiating a shutdown process by determining whether the system will be unable to provide an upcoming event notification to the user and, if so, provides that event notification before completing the logoff process. FIGS. 13 and 14 respectively illustrate a flowchart of operations for managing event reminder notifications based on initiation of a shutdown process which will power off a component of the computer system needed for generating the event reminder notification, and related computer system components according to some embodiments.

A shutdown process monitor 1400 identifies (block 1300) that a shutdown process has been initiated which will power off a component of the computer system, which is needed for generating the event reminder notification, within a threshold time before the initial time at which the event reminder notification is to be generated. The schedule management application 124 can trigger (block 1302) the event reminder notification to occur through the client/user interface 122 before completing the shutdown process. The schedule management application 124 may wait (block 1304) a threshold elapsed time following generation of the event reminder notification before allowing the shutdown process monitor 1400 or another application of the computer system to complete the shutdown process. In another embodiment, the schedule management application 124 may wait until an acknowledgement is received from the user following generation of the event reminder notification before allowing the shutdown process monitor 1400 or another application of the computer system to complete the shutdown process.

Figure 15:
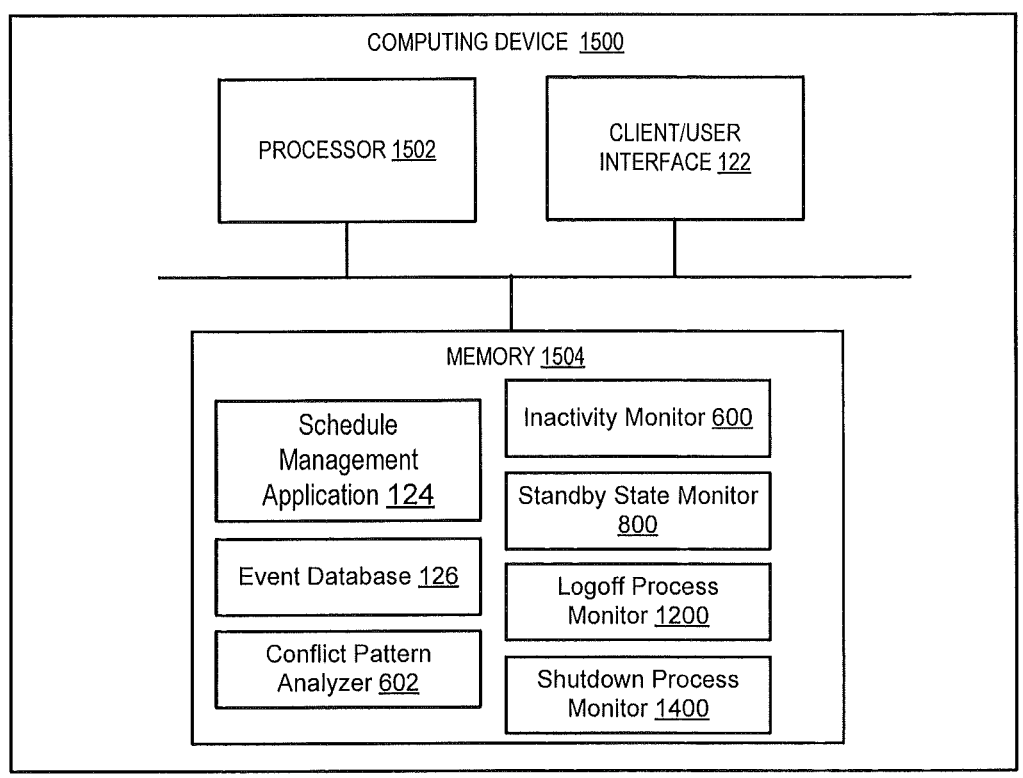
FIG. 15 is a block diagram of a computer device that may be used in the computer system of FIG. 1 according to some embodiments.

FIG. 15 is a block diagram of a computer device 1500 that can be configured to provide the functionality described herein as being provided by the computer system 100 of FIG. 1 according to some embodiments of the present disclosure. Functionality of the computer device 1500 may reside in a single device (e.g., a single server, tablet computer, desktop computer, cellular phone) or may be distributed across a plurality of networked devices. The computer device 1500 includes a processor 1502, a memory 1504, and a client/user interface 122. The client/user interface 122 can be include components that can receive information from a user and output messages/signaling directly to the user (e.g., keyboard, touch sensitive display device, speaker, etc.), and/or can be configured to communicate over one or more wired/wireless data networks with other components that interface with the user. The processor 1502 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 1502 is configured to execute computer readable program code of functional applications residing in the memory 1504, described below as a computer readable storage medium, to perform at least some of the operations and methods described herein as being performed by an authentication server in accordance with one or more embodiments disclosed herein. The functional applications may include the schedule management application 124, the event database 126, the inactivity monitor 600, the standby state monitor 800, the logoff process monitor 1200, the shutdown process monitor 1400, and/or the conflict pattern analyzer 602 described herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a buffered repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a processor of a computer system, the method comprising:

obtaining, by the processor of the computer system, scheduling data for a future event for a user of the computer system, the scheduling data comprising an initial time at which an event reminder notification for the future event is to be generated by the processor for the user of the computer system;

receiving logoff events from an operating system executed by the processor of the computer system, wherein the logoff events each comprise an indication of an action performed by the user of the computer system to logoff the user from an account of the operating system of the computer system;

initiating, by the processor of the computer system, a logoff process which will logoff the user from the account of the computer system;

identifying, by the processor of the computer system, a conflicting event that will conflict with providing the event reminder notification on the computer system to the user at the initial time;

calculating, by the processor of the computer system, an adjusted time at which the event reminder notification for the future event is to be generated on the computer system before occurrence of the conflicting event;

generating, by the processor of the computer system, the event reminder notification for the user of the computer system at the adjusted time rather than the initial time; and preventing, by the processor of the computer system, the logoff process from completing until after the event reminder notification has been generated, wherein generating the event reminder notification comprises communicating signaling through a user interface circuit to display a notification on a display screen of the computer system or play a notification on a computer speaker of the computer system, wherein identifying the conflicting event comprises identifying that a logoff process has been initiated which will logoff the user from the account of the computer system within a threshold time before the initial time at which the event reminder notification is to be generated, and wherein calculating the adjusted time at which the event reminder notification for the future event is to be generated before occurrence of the conflicting event, comprises triggering the event reminder notification to occur before completion of the logoff process.

2. The method of claim 1, further comprising:
preventing the logoff process from completing until an acknowledgement is received from the user through the user interface circuit following the generating the event reminder notification, before completing the logoff process.

3. The method of claim 1, further comprising:
preventing the logoff process from completing for a threshold elapsed time following the generating the event reminder notification before completing the logoff process.

4. The method of claim 1, wherein identifying the conflicting event that will conflict with providing the event reminder notification to the user at the initial time, comprises:
receiving a reserved timeframe from the user through operation of the user interface circuit; and
identifying the conflicting event based on time overlap between the initial time at which the event reminder is to be generated and the reserved timeframe.

5. The method of claim 4, wherein receiving the reserved timeframe from the user comprises:
receive a time range in a day of each of a plurality of weeks during which the user will be unavailable to receive an event reminder notification from the computer system, through operation of the user interface circuit.

6. The method of claim 1, further comprising:
receiving, by the processor, input signals provided by the user of the computer system, wherein the input signals comprise signals received from input devices connected to the user interface circuit;
computing by the processor, responsive to the receiving of the input signals, a period of inactivity comprising an absence of input signals from the user of the computer system indicating user inactivity with operating the user interface circuit for at least a threshold time; and
storing, in a data repository of the computer system, occurrence times of user inactivity associated with an occurrence of individual ones of a plurality of periods of inactivity,
wherein identifying the conflicting event that will conflict with providing the event reminder notification to the user at the initial time, further comprises:
identifying the conflicting event based on a pattern of occurrence times of inactivity notifications from within the occurrence times of user inactivity stored in the data repository.

7. A method by a processor of a computer system, the method comprising:
obtaining, by the processor of the computer system, scheduling data for a future event event for a user of the computer system, the scheduling data comprising an initial time at which an event reminder notification for the future event is to be generated by the processor for the user of the computer system;
receiving indications from an operating system of the computer system of a shutdown process performed by the user of the computer system, wherein the shutdown process comprises an action performed by the user of the computer system to power off a component of the computer system needed for generating the event reminder notification;
initiating, by the processor of the computer system, the shutdown process to power off the component of the computer system needed for generating the event reminder notification;
identifying, by the processor of the computer system, a conflicting event that will conflict with providing the event reminder notification on the computer system to the user at the initial time;
calculating, by the processor of the computer system, an adjusted time at which the event reminder notification for the future event is to be generated on the computer system before occurrence of the conflicting event;
generating, by the processor of the computer system, the event reminder notification for the user of the computer system at the adjusted time rather than the initial time; and
preventing, by the processor of the computer system, the shutdown process from completing until after the event reminder notification has been generated,
wherein generating the event reminder notification comprises communicating signaling through a user interface circuit to display a notification on a display screen of the computer system or play a notification on a computer speaker of the computer system,
wherein identifying the conflicting event comprises identifying that the shutdown process has been initiated within a threshold time before the initial time at which the event reminder notification is to be generated, and
wherein calculating the adjusted time at which the event reminder notification for the future event is to be generated before occurrence of the conflicting event, comprises triggering the event reminder notification to occur before completion of the shutdown process.

8. The method of claim 7, further comprising:
transitioning, by the processor, the computer system from a non-standby state to a standby state, wherein the standby state comprises entering a sleep mode, a screen lock/keyboard lock mode, or a lower power consumption mode; and
storing, in a data repository of the computer system, occurrence times of standby transitions associated with an occurrence of individual ones of a plurality of transitions of the operating system to the standby state,
wherein identifying the conflicting event that will conflict with providing the event reminder notification to the user at the initial time, further comprises:
identifying the conflicting event based on a pattern of occurrence times when a component of the computer system transitions from the non-standby state to the standby state from within the occurrence times of standby transitions stored in the data repository.

9. The method of claim 7, further comprising:
preventing the shutdown process from completing until an acknowledgement is received from the user through the user interface circuit following the generating the event reminder notification before completing the shutdown process.

10. The method of claim 7, further comprising:
preventing the shutdown process from completing for a threshold elapsed time following the generating the event reminder notification before completing the shutdown process.

11. A computer system comprising:
a processor; and a memory coupled to the processor and comprising computer readable program code that when executed by the processor causes the processor to perform operations to:

obtain scheduling data for a future event for a user of the computer system, the scheduling data comprising an initial time at which an event reminder notification for the future event is to be generated by the processor for the user of the computer system;

receive logoff events from an operating system executed by the processor, wherein the logoff events each comprise an indication of an action performed by the user of the computer system to logoff the user from an account of the operating system of the computer system;

initiate a logoff process which will logoff the user from the account of the computer system;

identify a conflicting event that will conflict with providing the event reminder notification on the computer system to the user at the initial time;

calculate an adjusted time at which the event reminder notification for the future event is to be generated on the computer system before occurrence of the conflicting event;

generate the event reminder notification for the user of the computer system at the adjusted time rather than the initial time; and prevent the logoff process from completing until after the event reminder notification has been generated, wherein generating the event reminder notification comprises communicating signaling through a user interface circuit to display a notification on a display screen of the computer system or play a notification on a computer speaker of the computer system, wherein identifying the conflicting event comprises identifying that a logoff process has been initiated which will logoff the user from the account of the computer system within a threshold time before the initial time at which the event reminder notification is to be generated, and wherein calculating the adjusted time at which the event reminder notification for the future event is to be generated before occurrence of the conflicting event comprises triggering the event reminder notification to occur before completion of the logoff process.

12. The computer system of claim 11, wherein the memory further comprises computer readable program code that when executed by the processor causes the processor to perform operations to:

receive a reserved timeframe from the user through the user interface circuit; and identify the conflicting event based on time overlap between the initial time at which the event reminder is to be generated and the reserved timeframe.

13. The computer system of claim 12, wherein the memory further comprises computer readable program code that when executed by the processor causes the processor to perform operations to:

receive the reserved timeframe from the user through the user interface circuit as a time range in a day of each of a plurality of weeks during which the user will be unavailable to receive an event reminder notification from the computer system.

14. The computer system of claim 11, wherein the memory further comprises computer readable program code that when executed by the processor causes the processor to perform operations to:

receive, by the processor, input signals provided by the user of the computer system, wherein the input signals comprise signals received from input devices connected to the user interface circuit;

computing, responsive to the monitoring of the input signals, a period of inactivity comprising an absence of input signals from the user of the computer system indicating user inactivity with operating the user interface circuit for at least a threshold time; and store, in a data repository of the computer system, occurrence times of user inactivity associated with an occurrence of individual ones of a plurality of periods of inactivity, wherein identifying the conflicting event that will conflict with providing the event reminder notification to the user at the initial time, further comprises:

identifying the conflicting event based on a pattern of occurrence times of inactivity notifications from within the occurrence times of user inactivity stored in the data repository.

15. The computer system of claim 11, wherein the memory further comprises computer readable program code that when executed by the processor causes the processor to perform operations to:

prevent the logoff process from completing until an acknowledgement is received from the user through the user interface circuit following the generating the event reminder notification before completing the logoff process.

16. The computer system of claim 11, wherein the memory further comprises computer readable program code that when executed by the processor causes the processor to perform operations to:

prevent the logoff process from completing for a threshold elapsed time following the generating the event reminder notification before completing the logoff process.

17. A computer system comprising:

a processor; and a memory coupled to the processor and comprising computer readable program code that when executed by the processor causes the processor to perform operations to:

obtain scheduling data for a future event for a user of the computer system, the scheduling data comprising an initial time at which an event reminder notification for the future event is to be generated by the processor for the user of the computer system;

receive indications from an operating system of the computer system of a shutdown process performed by the user of the computer system, wherein the shutdown process comprises an action performed by the user of the computer system to power off a component of the computer system needed for generating the event reminder notification;

initiate the shutdown process to power off the component of the computer system needed for generating the event reminder notification;

identify a conflicting event that will conflict with providing the event reminder notification on the computer system to the user at the initial time;

calculate an adjusted time at which the event reminder notification for the future event is to be generated on the computer system before occurrence of the conflicting event;

generate the event reminder notification for the user of the computer system at the adjusted time rather than the initial time; and prevent the shutdown process from completing until after the event reminder notification has been generated, wherein generating the event reminder notification comprises communicating signaling through a user interface circuit to display a notification on a display screen of the computer system or play a notification on a computer speaker of the computer system, wherein identifying the conflicting event comprises identifying that the shutdown process has been initiated within a threshold time before the initial time at which the event reminder notification is to be generated, and wherein calculating the adjusted time at which the event reminder notification for the future event is to be generated before occurrence of the conflicting event comprises triggering the event reminder notification to occur before completion of the shutdown process.

18. The computer system of claim 17, wherein the memory further comprises computer readable program code that when executed by the processor causes the processor to perform operations to:

transition the computer system from a non-standby state to a standby state, wherein the standby state comprises entering a sleep mode, a screen lock/keyboard lock mode, or a lower power consumption mode; and store, in a data repository of the computer system, occurrence times of standby transitions associated with an occurrence of individual ones of a plurality of transitions of the operating system to the standby state, wherein identifying the conflicting event that will conflict with providing the event reminder notification to the user at the initial time, further comprises:

identifying the conflicting event based on a pattern of occurrence times when a component of the computer system transitions from the non-standby state to the standby state from within the occurrence times of standby transitions stored in the data repository.

19. The computer system of claim 17, wherein the memory further comprises computer readable program code that when executed by the processor causes the processor to perform operations to:

prevent the shutdown process from completing until an acknowledgement is received from the user through the user interface circuit following the generating the event reminder notification before completing the shutdown process.

20. The computer system of claim 17, wherein the memory further comprises computer readable program code that when executed by the processor causes the processor to perform operations to:

prevent the shutdown process from completing for a threshold elapsed time following the generating the event reminder notification before completing the shutdown process.

* * * * *